United States Patent [19]

Frederickson

[11] Patent Number: 4,637,900
[45] Date of Patent: Jan. 20, 1987

[54] FABRICATION OF HIGH EXPOSURE NUCLEAR FUEL PELLETS

[75] Inventor: James R. Frederickson, Richland, Wash.

[73] Assignee: The United States of America as represented by the United States Department of Energy, Washington, D.C.

[21] Appl. No.: 570,553

[22] Filed: Jan. 13, 1984

[51] Int. Cl.[4] .................. G21C 21/02; C09K 11/04; B22F 1/00; B22F 3/16

[52] U.S. Cl. .................................. 252/643; 252/636; 252/638; 264/0.5; 264/56; 376/182; 376/267; 75/232; 419/23; 419/36; 419/37; 419/39; 419/57; 419/58

[58] Field of Search ............... 252/628, 629, 631, 636, 252/632, 638, 639, 643; 264/0.5, 56; 376/267, 172, 173, 182; 423/251, 253, 260, 261; 419/23, 36, 37, 38, 39, 57, 58; 75/232

[56] References Cited

U.S. PATENT DOCUMENTS

| | | | |
|---|---|---|---|
| 3,121,128 | 2/1964 | O'Leary et al. | 264/21 |
| 4,061,700 | 12/1977 | Gallivan | 264/0.5 |
| 4,093,682 | 6/1978 | Hrovat et al. | 264/0.5 |
| 4,094,738 | 6/1978 | Chubb | 264/0.5 |
| 4,138,360 | 2/1979 | Gallivan | 264/0.5 |
| 4,140,738 | 2/1979 | Hrovat et al. | 264/0.5 |
| 4,235,740 | 11/1980 | Druckenbrodt et al. | 252/643 |
| 4,256,676 | 3/1981 | Kovach | 264/0.5 |
| 4,264,540 | 4/1981 | Butler | 264/0.5 |
| 4,284,593 | 8/1981 | Sutcliffe et al. | 264/0.5 |
| 4,293,507 | 10/1981 | Sutcliffe et al. | 264/0.5 |
| 4,383,953 | 5/1983 | Larson et al. | 252/643 |
| 4,389,341 | 6/1983 | Gaines, Jr. et al. | 252/643 |
| 4,427,579 | 1/1984 | Gaines, Jr. et al. | 264/0.5 |

FOREIGN PATENT DOCUMENTS

| | | | |
|---|---|---|---|
| 0036214 | 9/1981 | European Pat. Off. | 264/0.5 |
| 1816044 | 7/1969 | Fed. Rep. of Germany | 264/0.5 |
| 2352351 | 5/1974 | Fed. Rep. of Germany | 252/643 |
| 3326848 | 3/1984 | Fed. Rep. of Germany | 252/638 |

*Primary Examiner*—Stephen J. Lechert, Jr.
*Assistant Examiner*—Howard J. Locker
*Attorney, Agent, or Firm*—R. D. Fuerle

[57] ABSTRACT

A method is disclosed for making a fuel pellet for a nuclear reactor. A mixture is prepared of $PuO_2$ and $UO_2$ powders, where the mixture contains at least about 30% $PuO_2$, and where at least about 12% of the Pu is the $Pu^{240}$ isotope. To this mixture is added about 0.3 to about 5% of a binder having a melting point of at least about 250° F. The mixture is pressed to form a slug and the slug is granulated. Up to about 4.7% of a lubricant having a melting point of at least about 330° F. is added to the granulated slug. Both the binder and the lubricant are selected from a group consisting of polyvinyl carboxylate, polyvinyl alcohol, naturally occurring high molecular weight cellulosic polymers, chemically modified high molecular weight cellulosic polymers, and mixtures thereof. The mixture is pressed to form a pellet and the pellet is sintered.

10 Claims, No Drawings

FABRICATION OF HIGH EXPOSURE NUCLEAR FUEL PELLETS

BACKGROUND OF THE INVENTION

The U.S. Government has rights in this invention pursuant to Contract No. DE-AC06-76FF02170 between the U.S. Department of Energy and the Westinghouse Electric Corporation and pursuant to Section 152 of the Atomic Energy Act of 1954.

Pellets for nuclear reactors are made by blending $PuO_2$ and $UO_2$ powders with an organic binder which is then compacted to form slugs. The slugs are granulated, then blended with a lubricant and pressed into green pellets. The green pellets are heated which decomposes and vaporizes the binder and lubricants. This is followed by sintering and grinding, as necessary, to the correct dimensions.

The binders and lubricants used to fabricate the pellets perform the functions of retaining compact integrity, lubricating the die walls of the pellet press, and providing sintered pellet density control and sintered pellet oxygen atom to metal atom ratio control. Typically, binders are low melting (150° F.) organics with good lubricating properties. For example, polyethylene glycols are commonly used as binders.

At the present time the plutonium used in many large field fuel production operations has about a 25% $PuO_2$ content with a $Pu^{240}$ isotopic content of less than 12% and a decay heat output of about 3 watts per kilogram. Presently used binders and lubricants perform satisfactorily without thermal or radiation degradation problems on this powder if the material is processed within 24 hours.

However, future breeder reactor fuel may use about 33% plutonium dioxide with a plutonium isotopic content of up to 20% $Pu^{240}$ and a heat energy output of about 6.7 watts per kilogram of plutonium. Thermal conductivity calculations indicate powder in a 6-inch diameter cylindrical container will reach centerline temperatures of about 250° F., and granulated material in the same container will reach centerline temperatures of about 330° F. Experiments using the presently used binders and lubricants indicate that the green pellet quality and die lubrication would be unacceptable under these conditions. Moreover, the problem could not be solved by reducing container sizes as that would not meet current throughput requirements.

SUMMARY OF THE INVENTION

I have discovered that certain binders and lubricants can be successfully used to fabricate fuel pellets containing large quantities of plutonium as $Pu^{240}$. By varying the binders and lubricants used I am able to control the quantity of oxygen removed from the $PuO_2$—$UO_2$ sintered pellets (the oxygen to metal ratio) and the pellet density. The binders and lubricants of this invention provide the process features and controls required for processing $UO_2$—$PuO_2$ powders into sintered nuclear fuel pellets at processing temperatures which would render previously used binders and lubricants useless.

RELEVANT ART

U.S. Pat. No. 4,093,682 discloses the use of phenol-formaldehyde binder resins and stearic acid as a lubricant for the production of block-shaped fuel elements.

U.S. Pat. No. 3,121,128 discloses the use of the plasticizer methyl cellulose as a binder for shaped fuel for nuclear reactors.

U.S. Pat. No. 4,094,738 discloses the use of paraffin as a binder in nuclear fuel pellets.

U.S. Pat. No. 4,140,738 describes the use of a binder resin which has a softening point above the melting point of the lubricant. The lubricants are preferably stearic acid, hard paraffin and octadecanol. It also discloses the use of an air displacing agent which may be an amine.

DESCRIPTION OF THE INVENTION

In the first step of preparing a nuclear fuel pellet according to the process of this invention, a blend is prepared of $PuO_2$ powder and $UO_2$ powder. While the $PuO_2$ and $UO_2$ in the blend can be in any proportion, the $PuO_2$ is preferably at least about 30% (all percentages herein are by weight) of the blend because the compositions of this invention are most effective with blends containing a high percentage of plutonium dioxide. For the same reason, the plutonium in the blend is preferably at least about 12% of the $Pu^{240}$ isotope.

To the blend is added about 0.3 to about 5% of a binder that has a melting temperature of at least about 250° F. Less than 0.3% binder does not adequately lubricate the die and more than about 5% binder may result in a lowering of the pellet integrity and erratic densities. Preferably, the binder has a particle size between $-100$ mesh and $+325$ mesh. Larger binder particles may cause large pores to form which can in turn cause pellet cracking. Finer binder particle sizes may form fine pores which collapse during sintering. Suitable binders of this invention include fatty acid diamides N, N'-disteroyl ethylene diamine ("DED"), polyvinyl carboxylate, polyvinyl alcohol ("PVA"), naturally occurring high molecular weight cellulosic polymers, and chemically modified high molecular weight cellulosic polymers. Polyvinyl alcohol is prepared by polymerizing polyvinyl acetate followed by hydrolyzation of the acetate groups. If the hydrolyzation is not complete, some acetate groups may remain on the polymer. Polyvinyl carboxylate is prepared by polymerizing vinyl cyanide. Cellulosic polymers include methyl cellulose ("MC"), ethyl cellulose, carboxymethyl cellulose, hydroxyethyl cellulose, cyanoethylated cellulose, and starch. DED, which has the chemical formula $H_{35}C_{17}COHNC_2H_4NHCOC_{17}H_{35}$, and other reactive ethylene diamine compounds were found to work. DED, polyvinyl alcohol and methyl cellulose, either alone or together, are the preferred binders as they have been found to work very well.

In the next step of this invention, a slug is prepared from the blend of the oxide powder and the binder. The slug is prepared by pressing the blend at a pressure of about 5,000 to about 25,000 psi. Lower and higher pressures may not result in granules which pelletize well. The slugs preferably have a diameter between about ½" and 1" as this range results in a high throughput while maintaining a uniform slug density. The slug diameter to its length should preferably be in a ratio of about 1:1 for ease of handling. The slugs may be produced at room temperature.

In the next step, the slugs are crushed to produce granules. The granules preferably have a size of about $-10$ to about $-60$ mesh as this size granule fills the dies properly and can be easily processed through sieves.

Up to about 4.7% of a lubricant is then mixed into the granules. While the pellets can be prepared without the addition of a lubricant, it is preferable to use at least 0.3% of a lubricant because this lubricates the press die.

the pellets were centerless ground to 0.1945 inches in diameter. The following table gives the binders and lubricants tested and measurements made on the pellets at various stages in their fabrication.

| TEST | BINDER | LUBRICANT | GREEN PELLET DENSITY | STND. DEV. | SINTERED PELLET DENSITY | STND. DEV. | OXYGEN TO METAL RATIO |
|---|---|---|---|---|---|---|---|
| A | 1% "DED" | 0.3% "DED" | 59.16 | 0.10 | 89.84 | 0.27 | 1.913 |
| B | 0.3% "DED" 0.7% PVA | 0.3% "DED" | 59.42 | 0.09 | 88.83 | 0.51 | 1.917 |
| C | 0.3% "DED" 0.7% MC | 0.3% "DED" | 59.21 | 0.09 | 88.88 | 0.43 | 1.921 |
| D | 1% "DED" | 0.3% "DED" | 60.12 | 0.31 | 94.51 | 0.32 | 1.899 |
| E | 1% "DED" | 0.3% "DED" | 62.17 | 0.09 | 91.70 | 0.37 | 1.899 |

(1) Same as Test A with 380° F. melting temperature ethylene diamine wax. Powder heated at 265° F. before slugging. Granules heated to 350° F. before pressing.
(2) Same as Test B with 455° F. melting temperature ethylene diamine wax. Powder and granules heated as in Test D.

The lubricant of this invention is a compound having a melting point of at least 330° F. because it is added to granules. Suitable lubricants with a melting temperature of at least 330° F. include high melting temperature ethylene diamine compounds fatty acid diamides, polyvinyl carboxylate, polyvinyl alcohol naturally occurring high molecular weight cellulosic polymers, chemically modified high molecular weight cellulosic polymers, and mixtures thereof; an example is methylcellulose. The preferred lubricants are the ethylene diamine compounds as they have been found to work very well.

In the next step of this invention, the lubricated granules are pressed into green pellets. Pressing is preferably done at about 20,000 to about 70,000 psi as lower pressures do not produce pellets which have good green strength for handling and higher pressures produce pellets which tend to laminate. Pellet diameter is typically about 0.15 to about 0.5 inches, and, for ease of handling and minimizing pellet hourglassing, the length to diameter ratio of the pellet is typically about 1.25:1. Pressing may be accomplished at room temperature.

After the green pellets have been prepared they are sintered at a temperature of about 1700°±200° C. That temperature range has been found to produce sintered pellet densities of about 90% of the theoretical density. Sintering typically requires about 4 to 10 hours to reach a stable density. Sintering is usually performed in a reducing atmosphere to keep the oxygen to metal ratio below 2.000. Argon containing about 8% hydrogen may be used as a reducing atmosphere.

After sintering is complete the pellets are ground as necessary to achieve the proper dimensions. Current specifications call for a pellet about 0.25 inches long having a diameter of 0.1945 inches.

The following examples further illustrate this invention.

EXAMPLE

In this experiment a blend was prepared of 33.33% $PuO_2$ and 66.67% $UO_2$. Of the $PuO_2$, 12% was the $Pu^{240}$ isotope. Various amounts of DED, PVA, and methyl cellulose having a particle size between about −100 mesh and +200 mesh were blended with the powder, and a ½" diameter slug was prepared under 10,000 psi. The slugs were granulated to −20 mesh and ethylene diamine lubricants having a particle size of about −100 to about 200 mesh were added and blended in. Green pellets were prepared by pressing the blend at 50,000 psi to a diameter of 0.234 inches and a length of 0.30 inches. The green pellets were sintered at 1700° C. for 4 hours in argon containing 8% hydrogen. Finally, In the above table all density results are in percent of theoretical density. The target density was 90.4±2% of theoretical density. The above experiments show that with minor process adjustments sintered fuel pellet densities in the range of those desired for production can be attained with these binders. Sintered pellet density standard deviations are adequate for density control and oxygen to metal ratios have been reduced with these binders/lubricants.

Similar experiments were performed using ammonium carbonate, dextrose, fructose, oxalic acid, sucrose, and zinc stearate as binders and/or lubricants. The results were not satisfactory.

I claim:

1. A method of making a fuel pellet for a nuclear reactor comprising
    (A) preparing a mixture of $PuO_2$ and $UO_2$ powders, said mixture containing at least about 30% $PuO_2$, where at least 12% by weight of said Pu is $Pu^{240}$;
    (B) adding to said mixture about 0.3 to about 5% of a binder having a melting temperature of at least about 250 F. selected from a group consisting of fatty acid diamides, polyvinyl carboxylate, polyvinyl alcohol, naturally occurring high molecular weight cellulosic polymers, chemically modified high molecular weight cellulosic polymers, and mixtures thereof;
    (C) pressing said mixture at about 5000 to about 25,000 psi to form a slug;
    (D) granulating said slug;
    (E) adding to said granulated slug a positive amount up to about 4.7% of a lubricant having a melting point of at least about 330° F., selected from the group consisting of fatty acid diamides, polyvinyl carboxylate, polyvinyl alcohol, naturally occurring high molecular weight cellulosic polymers, chemically modified high molecular weight cellulosic polymers, and mixtures thereof;
    (F) pressing said granulated slug at about 20,000 to about 70,000 psi to form a pellet; and
    (G) sintering said pellet at about 1700° C.±200° C.

2. A method according to claim 1 wherein said binder is N, N'-distearoyl ethylene diamine, polyvinyl alcohol, or methyl cellulose or mixtures thereof.

3. A method according to claim 1 wherein said lubricant is methyl cellulose.

4. A method according to claim 1 wherein said lubricant is polyvinyl alcohol.

5. A method according to claim 1 wherein said lubricant is a fatty acid diamide.

6. A sintered pellet prepared according to the method of claim 1.

7. A method according to claim 1 wherein said slug is granulated to a particle size of about −10 to about −60 mesh.

8. A method according to claim 1 wherein said pellet has a diameter of about 0.15 to about 0.5 inches and a length to diameter ratio of about 1.25:1.

9. A method according to claim 1 wherein said sintering is performed for about 4 to about 10 hours in a reducing atmosphere that keeps the oxygen to metal ratio below 2.

10. A method according to claim 1 wherein said binder and said lubricant each comprise N,N'-disteroyl ethylene diamine.

* * * * *